United States Patent Office
3,082,225
Patented Mar. 19, 1963

3,082,225
NOVEL 1-METHYL-1,3,5(10),9(11)-ESTRATETRA-
ENES AND METHODS FOR THEIR MANU-
FACTURE
Hans Reimann, Bloomfield, N.J., assignor to Schering
Corporation, Bloomfield, N.J., a corporation of New
Jersey
No Drawing. Filed Sept. 15, 1961, Ser. No. 138,270
13 Claims. (Cl. 260—397.45)

This invention relates to novel 1-methyl-1,3,5(10),9(11)-estratetraenes, valuable as therapeutics and as intermediates, and to a novel method for their manufacture.

More particularly, this invention relates to a process whereby 3-keto-1,4,9(11)-trienes in an anhydrous acid medium undergo rearrangement to the corresponding 1-methyl-3-hydroxy-1,3,5(10),9(11)-estratrienes which are therapeutically active per se, and are valuable as intermediates in the preparation of other therapeutically active steroids.

Among the novel, 1,3,5(10),9(11)-estratrienes prepared by my novel process are compounds of the following structural formula:

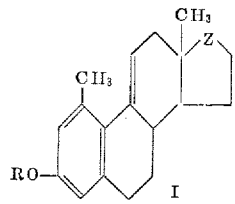

wherein R is selected from the group consisting of hydrogen, lower alkyl, lower alkanoyl, Z is selected from the group consisting of:

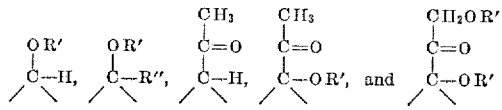

with R' representing a substituent selected from the group consisting of hydrogen and lower alkanoyl, and R" representing a substituent selected from the group consisting of lower alkyl and ethinyl.

In addition to the foregoing estratrienes, 1-methyl-9(11)-dehydroestrone and the 3-lower alkyl ethers and 3-ester derivatives thereof may be prepared by the novel process of my invention.

The above definition of the novel compounds prepared by my new method of derivation should not be strictly construed, but rather may be considered to admit the presence of other substituents on the steroid nucleus particularly at positions 6 and 16 such as the 6α-methyl, 6α-fluoro, 6α-chloro, 16α-hydroxy, 16α-acyloxy, 16-methyl and 16-halogen analogs thereof. This modification depends solely on the choice of starting material which may possess the desired substituents in the positions indicated.

The terms "lower alkyl" and "lower alkanoyl" as they appear above represent those substituents having from 1 to 6 carbon atoms therein, such as methyl, ethyl, propyl, butyl, and formyl, acetyl, butyryl, propionyl and the like, respectively.

The lower alkyl radicals represented by R are exemplified by methyl, ethyl, propyl, butyl, pentyl, hexyl, and the branched chain isomers thereof. Some examples of lower alkanoyl radicals as designated by R' are formyl, acetyl, propionyl, butyryl, valeryl, caproyl, and the branched chain isomers thereof, said groups being the acyl radicals of alkanoic acids containing up to 6 carbon atoms. Halogen as employed herein has its conventional scope to embrace chlorine, bromine, fluorine and iodine.

In general to carry out the novel process of my invention a steroidal 3-keto-1,4,9(11)-triene of the androstane or pregnane series is treated with a strong acid catalyst having a dissociation constant equal to or greater than $2 \times 10^{-1}$, exemplified by acids such as p-toluenesulfonic acid and trifluoroacetic acid, in a solvent, preferably a lower alkanoic acid or acid anhydride, at a temperature in the range of about 20–100° C. for a period extending anywhere from one half to 72 hours. The reaction time will depend on the temperature of the reaction maintained, the particular activity of the catalyst employed, and the nature of the specific steroid converted. The product recovered will be found to consist of a 1-methylated-1,3,5(10),9(11)-estratetraene such as are illustrated above.

The starting materials for our process are in general known 3-keto-1,4,9(11)-pregnatrienes or 3-keto-1,4,9(11)-androstatrienes which include, for instance, 1,4,9(11)-androstatriene-3,17-dione, 1,4,9(11) - androstatriene-17β-ol-3-one, 1,4,9(11)-pregnatriene-17α-ol-3,20-dione, 1,4,9-(11)-pregnatriene-3,20-dione, 1,4,9(11)-pregnatriene-17α, 21-diol-3,20-dione 21-acetate, and the like. These starting materials may also be substituted in the nucleus or in the side chain, for example in the 6 and/or 16 position, by halogeno or lower alkyl groups, hydroxy or acyloxy groups such as 6α-fluoro-1,4,9(11)-androstatriene-3,17-dione, 6α-fluoro-1,4,9(11) - pregnatriene - 17α,21-diol-3,20-dione, 6α-methyl-1,4,9(11)-androstatriene-3,17-dione and 6α-methyl-1,4,9(11)-pregnatriene - 17α-21-diol-3,20-dione disclosed in copending application Serial No. 817,071, filed June 1, 1959, now Patent No. 3,032,564 and the known 16-methyl substituted 1,4,9(11)-trienes such as 16α-methyl-1,4,9(11)-pregnatriene - 17α,21-diol - 3,20-dione, 16α-methyl-1,4,9(11)-androstatriene-3,17-dione, 16α - methyl-1,4,9(11) - androstatriene - 17β - ol - 3-one, and other 16-chloro-, 16-fluoro-, 16-hydroxy-, and 16-acyloxy- substituted 1,4,9(11)-androstatriene - 3,17 - diones and pregnatriene-3,20-diones well known in the art.

For instance, a suitable starting material selected from the above for the manufacture of our novel compounds is 1,4,9(11)-pregnatriene-17α-ol-3,20-dione. Illustratively, the reaction of this compound with trifluoroacetic anhydride in acetic acid accompanied by heating results in the formation of 1-methyl - 17β - acetyl-1,3,5(10),9(11)-estratetraene - 3,17α - diol diacetate (1-methyl-19-nor-1,3, 5(10),9(11)-pregnatetraene-3,17α-diol-20-one diacetate). Further treatment of this ester with a reagent such as methanolic potassium hydroxide gives the corresponding 3,17-diol. Alternatively, treatment of the 3,17-diacetate with perchloric acid in methanol will hydrolyze the ester group on the 3-carbon to a hydroxy group yielding another of the novel compounds of this invention, i.e., 1-methyl-17β-acetyl-1,3,5(10),9(11) - estratetraene-3,17α-diol 17-acetate (1-methyl-19-nor-1,3,5(10),9(11)-pregnatetraene-3,17α-diol-20-one 17-acetate). This latter product may, in turn, be treated with a reagent such as benzoyl chloride in pyridine to give the corresponding 3-benzoate ester, i.e., 1-methyl-17β-acetyl-1,3,5(10),9(11)-estratetraene-3,17α-diol 17-acetate 3-benzoate (1-methyl-19-nor-1,3,5(10),9(11) - pregnatetraene-3,17α-diol-20-one 3-benzoate 17-acetate).

Suitable catalyst-solvent combinations are, for example, trifluoroacetic anhydride-acetic acid, p-toluenesulfonic acid-acetic acid, and the like. Other suitable acid catalysts include benzenesulfonic acid, and anhydrous hydrochloric and sulfuric acids, while solvents may include such as propionic acid, propionic anhydride, butyric acid, and the like. These are selected at random and it is to be realized that other variations in catalysts and solvents will readily occur to those skilled in the art. In the case of trifluoroacetic anhydride, it should be noted that this anhydride should be employed with a carboxylic acid so as to set up an equilibrium whereby trifluoroacetic acid is generated in situ in the system.

It has heretofore been unknown to subject a 3-keto-1,4,9(11)-triene steroid to an acid-catalyzed rearrangement medium such as is disclosed herein. Furthermore, it is unexpected, under the anhydrous conditions of my process, that a 1-methyl-3-hydroxy-aromatic-A-ring steroid is obtained from the 3-keto-1,4,9(11)-triene starting compounds of my process. Heretofore, C-ring-unsubstituted-3-keto-1,4-dienes devoid of a conjugated double bond at C-6 (e.g., 1,4-androstadiene-3,17-dione) when subjected to anhydrous, strong acid conditions similar to those of my process, would convert to a 1-hydroxy-4-methyl steroid (e.g., to 1-hydroxy-4-methyl - 1,3,5(10) - estratriene - 17-one). By my process, on the other hand, steroids devoid of conjugated double bonds and unsubstituted in the C-ring, e.g., 3-keto-1,4,9(11)-trienes such as 1,4,9(11)-pregnatriene - 3,20 - dione and 1,4,9(11)-androstatriene-3,17-dione, are catalytically rearranged in an anhydrous, strong acid medium to the corresponding 1-methyl-3-hydroxy-17β-acetyl-1,3,5(10),9(11) - estratetraene (i.e., 1-methyl-3-hydroxy-19 - nor - 1,3,5(10),9(11) - pregnatetraene-20-one) and 1-methyl-9(11)-dehydroestrone (i.e., 1-methyl-1,3,5(10),9(11)-estratetraene-3-ol-17-one) respectively.

As a general rule, when an anhydride is employed in my process, the corresponding ester of the phenolic hydroxyl at the 3-carbon is obtained and any other hydroxyl groups in the molecule are also esterified. On the other hand, when an acid is used as the solvent, the corresponding free phenol may be obtained.

By my novel process as described herein, 1,4,9(11)-androstatriene-3-one-17β-ol and 16α - methyl - 1,4,9(11)-androstatriene-3-one-17β-ol upon reaction with p-toluenesulfonic acid in acetic acid yields respectively 1-methyl-9(11) - dehydroestradiol and 1,16α-dimethyl-9(11)-dehydroestradiol. Alternatively, the 1-methyl-9(11)-dehydroestradiols of my invention may be derived by utilizing known techniques from 1-methyl-9(11)-dehydroestrone which, in turn, is obtained by the process of this invention by the action of p-toluenesulfonic acid in acetic acid on 1,4,9(11)-androstatriene-3,17-dione. Thus, for example, reduction of 1-methyl-9(11)-dehydroestrone with sodium borohydride yields 1-methyl-9(11)-dehydroestradiol which may, if desired, be transformed by conventional methods such as with acetic anhydride in pyridine to its ester derivatives. Additionally, the 17-keto group of 1-methyl-9(11)-dehydroestrone may be treated with an alkyl Grignard reagent such as methyl magnesium iodide to give the corresponding 17α-methyl - 17β - hydroxy compound, 1,17α - dimethyl - 9(11) - dehydroestradiol. Similarly, 1-methyl-9(11)-dehydroestrone upon reaction with sodium acetylide according to known techniques yields the corresponding 17α-ethinyl - 17β-hydroxysteroid, 1-methyl-17α-ethinyl-9(11)-dehydroestradiol. If desired, the phenolic 3-hydroxy group in the estratetraenes prepared by my process may be esterified in the usual manner, or converted to an ether function, for example 3-methoxy, by means of dimethyl sulfate and base.

The 1,3,5(10),9(11)-estratetraenes of my invention are valuable as intermediates in the synthesis of therapeutically valuable 9,11-disubstituted-1-methyl-aromatic-A-ring steroids such as are described in co-pending application of Reimann and Robinson, Serial No. 138,271 filed on even date with the instant application. The 9(11)-double bond of the estratetraenes of this invention may be utilized in the synthesis of 9,11-disubstituted-1-methyl-estrogens of Reimann et al. by addition of halogens or hypohalous acids and the like, to yield 9,11-dihalogenated compounds or 9,11-halohydrins and esters thereof.

In addition to their use as intermediates the novel compounds of this invention show useful estrogen-like activity, such as the ability to lower serum cholesterol while exhibiting greatly reduced, undesirable estrogenic side-effects. On the other hand, the novel derivatives procured from pregnane starting materials, i.e., those having a corticoid side chain, show anti-corticoid and anti-androgenic properties.

The invention will appear more fully from the examples which follow. These examples are set forth by way of illustration only, and it is to be understood that the invention is not to be construed as limited to the details contained therein as many modifications in materials and methods will be apparent from the disclosure to those skilled in the art. The invention is to be limited only by the scope of the appended claims.

EXAMPLE 1

*1-Methyl-1,3,5(10),9(11)-Estratetraene-3-Ol-17-One*

(A) To a solution of 1.0 g. of 1,4,9(11)-androstatriene-3,17-dione in 40 ml. of acetic anhydride is added 250 mg. of p-toluene-sulfonic acid. The mixture is flushed with argon and heated on the steam bath for 5 hours, then poured into ice-water and stirred to hydrolyze any excess anhydride. The resulting product containing 1-methyl-1,3,5(10),9(11)-estratetraene-3-ol-17-one acetate, is dissolved in 20 ml. of methanol, then a solution of 1 g. of potassium hydroxide in 2 ml. of water is added and the mixture heated under reflux for 20 minutes. The solution is poured into ice-water and acidified with hydrochloric acid. The resulting precipitate is filtered, washed with water, dried, crystallized from ether-hexane and recrystallization from ether to give 1-methyl-1,3,5(10),9(11)-estratetraene-3-ol-17-one M.P. 163–165° C;

$\lambda_{max.}^{MeOH}$ 215 m$\mu$ ($\epsilon$ 24,100), 253 m$\mu$ ($\epsilon$ 12,100)

$[\alpha]_D$ +245° C. (CHCl$_3$). This compound is soluble in dilute aqueous base.

(B) To a solution of 1.0 g. of 1,4,9(11)-androstatriene-3,17-dione in 40 ml. acetic acid is added 250 mg. of p-toluenesulfonic acid. The mixture is heated on the steam bath for 5 hours, then poured into ice-water. The resulting precipitate is filtered, dried, and crystallized twice from ether-hexane to give 1-methyl-1,3,5(10),9(11)-estratetraene-3-ol-17-one (i.e., 1-methyl-9(11)-dehydroestrone).

EXAMPLE 2

*1-Methylestrone*

To a suspension of 60 mg. of 10% palladium on strontium carbonate in 5 ml. ethanol, prehydrogenated at room temperature and atmospheric pressure, is added a solution of 75 mg. of 1-methyl-1,3,5(10),9(11)-estratetraene-3-ol-17-one in 8 ml. ethanol. The solution is hydrogenated until no more hydrogen uptake is observed. The palladium catalyst is filtered off and the filtrate concentrated to a residue which is crystallized from aqueous ethanol, and recrystallization from methanol to give 1-methylestrone, M.P. 243–247° C.;

$\lambda_{max.}^{MeOH}$ 214 m$\mu$ ($\epsilon$ 10,400), 282,287 m$\mu$ ($\epsilon$ 1,760)

The infrared spectrum is identical with that of an authentic sample.

EXAMPLE 3

*1-Methyl-1,3,5(10),9(11)-Estratetraene-3-Ol-17-One Acetate*

To a solution of 250 mg. of 1-methyl-1,3,5(10),9(11)-estratetraene-3-ol-17-one in 5 ml. of pyridine is added 1 ml. of acetic anhydride. The mixture is allowed to stand at room temperature for 22 hours, then is poured into ice-water and stirred to hydrolyze any excess anhydride. A solid separates which is crystallized from ether to give 1-methyl-1,3,5(10)-estratetraene-3-ol-17-one acetate, M.P. 125–126° C.;

$\lambda_{max.}^{MeOH}$ 212 m$\mu$ ($\epsilon$ 27,000), 247 m$\mu$ ($\epsilon$ 13,300)

$[\alpha]_D$ +215° (CHCl$_3$).

EXAMPLE 4

1-Methyl-1,3,5(10),9(11)-Estratetraene-3-Ol-17-One Methyl Ether

To a solution of 500 mg. of 1-methyl-1,3,5(10),9(11)-estratetraene-3-ol-17-one in 25 ml. methanol is added a solution of 3 g. potassium hydroxide in 5 ml. of water. The mixture is chilled and 2 ml. of dimethyl sulfate is added dropwise, then the mixture is stirred at room temperature for ½ hour. Additional 2 ml. portions of dimethyl sulfate are added at the next two ½ hour intervals, then the mixture is stirred a final ½ hour, and allowed to evaporate overnight. The resultant residue is washed with water, dried, crystallized twice from ether-hexane to give 1-methyl-1,3,5(10),9(11) - estratetraene-3-ol-17-one methyl ether, M.P. 100–102° C.;

$\lambda_{max.}^{MeOH}$ 213 m$\mu$ ($\epsilon$ 31,300), 252 m$\mu$ ($\epsilon$ 17,300)

$[\alpha]_D$ +262° (CHCl$_3$).

EXAMPLE 5

1-Methyl-17α-Ethinyl-1,3,5(10),9(11)-Estratetraene-3,17β-Diol

To a solution of 250 mg. of 1-methyl-1,3,5(10),9(11)-estratetraene-3-ol-17-one in 6 ml. of dimethylsulfoxide, cooled to about 15° C. is added sodium acetylide, obtained by centrifugation of 1.5 ml. of a 17% suspension in xylene, in 2 ml. of dimethylsulfoxide. The mixture is stirred at room temperature for 25 minutes, then poured into ice-water and the solution acidified with hydrochloric acid. The resulting precipitate is filtered, washed with water, dried and crystallized from acetone-hexane to give 1 - methyl - 17α - ethinyl - 1,3,5(10),9(11) - estratetraene-3,17β-diol, $\lambda_{max.}^{MeOH}$ 214, 253 m$\mu$

EXAMPLE 6

1-Methyl-1,3,5(10),9(11)-Estratetraene-3,17β-Diol

A solution of 2.5 g. of 1-methyl-1,3,5(10),9(11)-estratetraene-3-ol-17-one in 50 ml. of methanol is chilled in ice. To the chilled solution 2.5 g. of sodium borohydride is added in portions and the resulting solution kept at 0° C. until foaming subsides. The reaction mixture is then allowed to stand at room temperature for 1 hour, acidified with 5% hydrochloric acid and diluted with water. The resulting precipitate is filtered and crystallized from aqueous acetone to give 1-methyl-1,3,5(10),9(11)-estratetraene-3,17β-diol, M.P. 148–152° C.;

$\lambda_{max.}^{MeOH}$ 215 m$\mu$ ($\epsilon$ 25,000), 253 m$\mu$ ($\epsilon$ 13,200)

$[\alpha]_D$ +138° (CHCl$_3$).

EXAMPLE 7

1-Methyl-1,3,5(10),9(11)-Estratetraene-3,17β-Diol Diacetate (A) A solution of 1.5 g. of the 1-methylestratetraene of Example 6 in 15 ml. of pyridine and 2 ml. of acetic anhydride is allowed to stand at room temperature for 18 hours. The solution is then poured into ice-water and the resulting precipitate is filtered, dried, and crystallized twice from ether-hexane to give 1-methyl-1,3,5(10),9(11)-estratetraene-3,17β-diol diacetate, M.P. 128–129° C.; $[\alpha]_D$ +78° (CHCl$_3$).

(B) To a solution of 1.0 g. of 1,4,9(11)-androstatriene-17β-ol-3-one in 40 ml. of acetic anhydride is added 250 mg. of p-toluenesulfonic acid. The flask is flushed with argon and the mixture is heated on the steam-bath for 5 hours, then poured into ice-water, and stirred for ½ hour to hydrolyze any excess anhydride. The resulting precipitate is filtered, washed with water, dried, and crystallized from ether-hexane to give 1-methyl-1,3,5(10), 9(11)-estratetraene-3,17β-diol diacetate.

EXAMPLE 8

1-Methyl-1,3,5(10),9(11)-Estratetraene-3,17β-Diol Dipropionate

To a solution of 500 mg. of 1,4,9(11)-androstatriene-17β-ol-3-one in 20 ml. of propionic anhydride is added 125 mg. of p-toluenesulfonic acid. The mixture is reacted and the resulting product isolated in a manner similar to the procedure of Example 7B. The product is then crystallized from ether-hexane to give 1-methyl-1,3,5(10), 9(11)-estratetraene-3,17β-diol dipropionate.

EXAMPLE 9

1 - Methyl - 17β - Acetyl - 1,3,5(10),9(11) - Estratetraene-3,17α-Diol Diacetate (1-Methyl-19-Nor-1,3,5(10), 9(11)-Pregnatetraene-3,17α-Diol-20-One Diacetate)

A solution of 1.0 g. of 1,4,9(11)-pregnatriene-17α-ol-3,20-dione in 10 ml. of acetic acid and 2 ml. of trifluoroacetic anhydride is flushed with argon and heated on the steam-bath for 50 minutes. The solution is then cooled and poured into ice-water. The resulting precipitate is filtered, dried, dissolved in ether and filtered through a short Florisil column. The eluted oil is triturated with ether-pentane to give a solid which is crystallized from ether-hexane to give 1-methyl-17β-acetyl-1,3,5(10),9(11)-estratetraene-3,17α-diol diacetate, M.P. 143–146° C.;

$\lambda_{max.}^{MeOH}$ 211 m$\mu$ ($\epsilon$ 27,000), 248 m$\mu$ ($\epsilon$ 13,800)

$[\alpha]_D$ +84° (CHCl$_3$).

EXAMPLE 10

1 - Methyl - 17β - Acetyl - 1,3,5(10),9(11) - Estratetraene-3,17α-Diol 17-Acetate (1-Methyl-19-Nor-1,3,5(10), 9(11)-Pregnatetraene-3,17α-Diol-20-One 17-Acetate)

To a solution of 530 mg. of 1-methyl-17β-acetyl-1,3,5 (10),9(11)-estratetraene-3,17α-diol diacetate in 25 ml. of methanol is added 0.53 ml. of 70% perchloric acid and the mixture allowed to stand at room temperature for 18 hours, then poured into ice-water. The resulting precipitate is filtered, dried and chromatographed on Florisil. Suitable fractions, as determined by paper chromatography, are combined and crystallized from ether-hexane and ether-acetone to give 1-methyl-17β-acetyl-1,3,5(10), 9(11)-estratetraene-3,17α-diol 17-acetate, M.P. 227–235° C.;

$\lambda_{max.}^{MeOH}$ 215 m$\mu$ ($\epsilon$ 24,000), 252 m$\mu$ ($\epsilon$ 12,300)

$[\alpha]_D$ +110° (CHCl$_3$).

EXAMPLE 11

1 - Methyl - 17β - Acetyl - 1,3,5(10),9(11) - Estratetraene-3,17α-Diol (1-Methyl-19 - Nor - 1,3,5(10),9(11)-Pregnatetraene-3,17α-Diol-20-One)

A solution of 100 mg. of the 3,17-diacetate of Example 9 in 4.5 ml. of 5% potassium hydroxide in methanol and 0.5 ml. of water is heated under reflux for 15 minutes. It is then acidified with dilute hydrochloric acid and poured into water. The resultant precipitate is filtered and crystallized twice from ether-hexane to give 1-methyl-17β-acetyl-1,3,5(10),9(11)-estratetraene-3,17α-diol, M.P. 197–205° C.;

$\lambda_{max.}^{MeOH}$ 215 m$\mu$ ($\epsilon$ 27,800), 254 m$\mu$ ($\epsilon$ 13,900)

$[\alpha]_D$ +86° (CHCl$_3$).

Alternatively, the 17-monoacetate compound of Example 10 is hydrolyzed according to the above procedure to give the desired product, identical with that prepared from the diacetate as above.

EXAMPLE 12

1 - Methyl - 17β - Acetyl - 1,3,5(10),9(11) - Estratetraene-3-Ol (1-Methyl-19-Nor-1,3,5(10),9(11)-Pregnatetraene-3-Ol-20-One)

A sample of 500 mg. of 1,49(11)-pregnatriene-3,20-dione is allowed to react with acetic anhydride and p- toluene-sulfonic acid according to the procedure of Example 1A and the product hydrolyzed and isolated as described, then crystallized twice from ether-hexane to give 1-methyl-17β-acetyl-1,3,5(10),9(11)-estratetraene-3-ol, $\lambda_{max.}^{MeOH}$ 215 mμ (ε 25,200), 253 mμ (ε 12,900)

[α]$_D$ +204° (CHCl$_3$).

EXAMPLE 13

*1 - Methyl - 17β(β' - Acetoxyacetyl) - 1,3,5(10),9(11)-Estratetraene-3,17α-Diol-20-One Diacetate (1-Methyl-19 - Nor - 1,3,5(10),9(11) - Pregnatetraene - 3,17α,21-Triol-20-One Triacetate*

Five g. of 1,4,9(11)-pregnatriene-17α,21-diol-3,20-dione 21-acetate is allowed to react with acetic anhydride and p-toluenesulfonic acid according to the procedure of Example 7B to give 1-methyl-17β(β'-acetoxyacetyl)-1,3,5(10),9(11)-estratetraene-3,17α-diol-20-one diacetate $\lambda_{max.}^{MeOH}$ 213 mμ (ε 23,300), 247 mμ (ε 10,300)

EXAMPLE 14

*1-Methyl-17β-Acetyl-1,3,5(10),9(11)-Estratetraene-3,17α-Diol 3-Benzoate 17-Acetate*

To a solution of 800 mg. of 1-methyl-17β-acetyl-1,3,5(10),9(11)-estratetraene-3,17α-diol 17-acetate (the compound of Example 10) in 10 ml. of pyridine is added 1 ml. of benzoyl chloride. The mixture is allowed to stand at room temperature overnight and then is poured into ice water and stirred for 20 minutes. A solid separates which is filtered, dried, and crystallized from acetone-hexane to give 1-methyl-17β-acetyl-1,3,5(10),9(11)-estratetraene-3,17α-diol 3-benzoate 17-acetate.

EXAMPLE 15

*1,17α-Dimethyl-1,3,5(10),9(11)-Estratetraene-3,17β-Diol*

To a solution of 1 gram of 1-methyl-1,3,5(10),9(11)-estratetraene-3-ol-17-one (the compound of Example 1) in 50 ml. of tetrahydrofuran is added dropwise with stirring to an ethereal solution of methyl magnesium iodide (prepared from 3 grams of magnesium metal and 7.5 ml. of methyl iodide in 200 ml. of anhydrous ether). The reaction mixture is diluted with 150 ml. of tetrahydrofuran then distilled until 200 ml. of distillate has been collected. The reaction mixture is then refluxed for 1 hour, cooled and poured slowly into 200 ml. of cold 10% aqueous ammonium sulfate solution. The mixture is extracted with methylene chloride and the organic extracts are combined, washed with water, and concentrated to a residue which is crystallized from acetone-hexane to give 1,17α-dimethyl-1,3,5(10),9(11)-estratetraene-3,17β-diol.

By substituting other Grignard reagents, such as ethyl magnesium bromide for methyl magnesium iodide in the above procedure, there is obtained the corresponding 17α-alkyl derivative, e.g., 1-methyl-17α-ethyl-1,3,5(10),9(11)-estratetraene-3,17β-diol.

EXAMPLE 16

*1,16α-Dimethyl-1,3,5(10),9(11)-Estratetraene-3,17β-Diol (1,16α-Dimethyl-9(11)-Dehydroestradiol)*

16α-Methyl-1,4,9(11)-androstatriene-17β-ol-3-one is reacted with p-toluenesulfonic acid in acetic acid in the manner described in Example 1B. The resultant product is isolated as described to give 1,16α-dimethyl-1,3,5(10),9(11)-estratetraene-3,17β-diol.

I claim:
1. A process for the production of 1-methyl-hydroxy-1,3,5(10),9(11)-estratetraenes which comprises heating a 3-keto-1,4,9(11)-triene taken from the group consisting of 3-keto-1,4,9(11)-androstatrienes and 3-keto-1,4,9(11)-pregnatrienes with a strong acid catalyst in a solvent of the group consisting of carboxylic acids and carboxylic acid anhydrides.

2. A process according to claim 1 wherein the strong acid catalyst is p-toluenesulfonic acid and the solvent is acetic anhydride.

3. A process according to claim 1 wherein the strong acid catalyst is p-toluenesulfonic acid and the solvent is acetic acid.

4. A process according to claim 1 wherein the strong acid catalyst is trifluoroacetic anhydride and the solvent is acetic acid.

5. In the process for the production of compounds having the following structural formula:

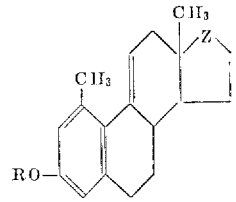

wherein R is selected from the group consisting of hydrogen, lower alkyl and lower alkanoyl; Z is selected from the group consisting of:

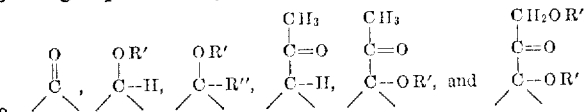

R' being selected from the group consisting of hydrogen and lower alkanoyl; R'' being selected from the group consisting of lower alkyl and ethinyl; the step which comprises heating a compound of the formula:

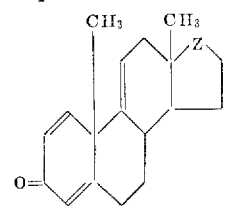

wherein Z is as defined above, with a strong acid catalyst in a solvent of the group consisting of carboxylic acids and carboxylic acid anhydrides.

6. A compound of the structural formula:

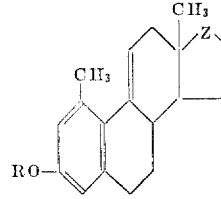

wherein R is selected from the group consisting of hydrogen, lower alkyl and lower alkanoyl; Z is selected from the group consisting of:

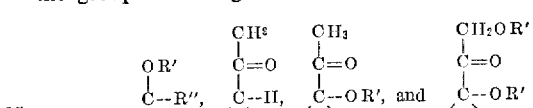

R' being selected from the group consisting of hydrogen and lower alkanoyl; R'' being selected from the group consisting of lower alkyl and ethinyl.

7. 1 - methyl - 17α - ethinyl - 1,3,5(10),9(11)-estratetraene-3,17β-diol.

8. 1,17α - dimethyl - 1,3,5(10),9(11) - estratetraene-3,17β-diol.

9. 1 - methyl - 17β - acetyl - 1,3,5(10),9(11) - estratetraene-3,17α-diol diacetate.

10. 1 - methyl - 17β - acetyl - 1,3,5(10),9(11) - estratetraene-3,17α-diol 17-acetate.

11. 1 - methyl - 17β - acetyl - 1,3,5(10),9(11) - estratetraene-3,17α-diol.

12. 1 - methyl - 17β - acetyl - 1,3,5(10),9(11) - estratetraene-3-ol.

13. 1 - methyl - 17β(β' - acetoxyacetyl) - 1,3,5(10),9(11)-estratetraene-3,17α-diol 3,17-diacetate.

References Cited in the file of this patent

Elks et al.: Proceeding of the Chemical Society, January 1959, pp. 6 and 7.

Mills et al.: J.A.C.S. 82 5882–5889 (Nov. 20, 1960) (p. 5883 depended upon).

Kirk et al.: J.C.S. (1960), pp. 4664–4667.

UNITED STATES PATENT OFFICE
CERTIFICATE OF CORRECTION

Patent No. 3,082,225                          March 19, 1963

Hans Reimann

It is hereby certified that error appears in the above numbered patent requiring correction and that the said Letters Patent should read as corrected below.

Column 7, line 71, for "1-methyl-hydroxy-" read -- 1-methyl-3-hydroxy- --.

Signed and sealed this 8th day of October 1963.

(SEAL)
Attest:

ERNEST W. SWIDER                          EDWIN L. REYNOLDS
Attesting Officer                          Acting Commissioner of Patents